H. W. JACOBS & H. H. LANNING.
ACETYLENE GENERATING APPARATUS.
APPLICATION FILED NOV. 28, 1911.
1,173,430.
Patented Feb. 29, 1916.
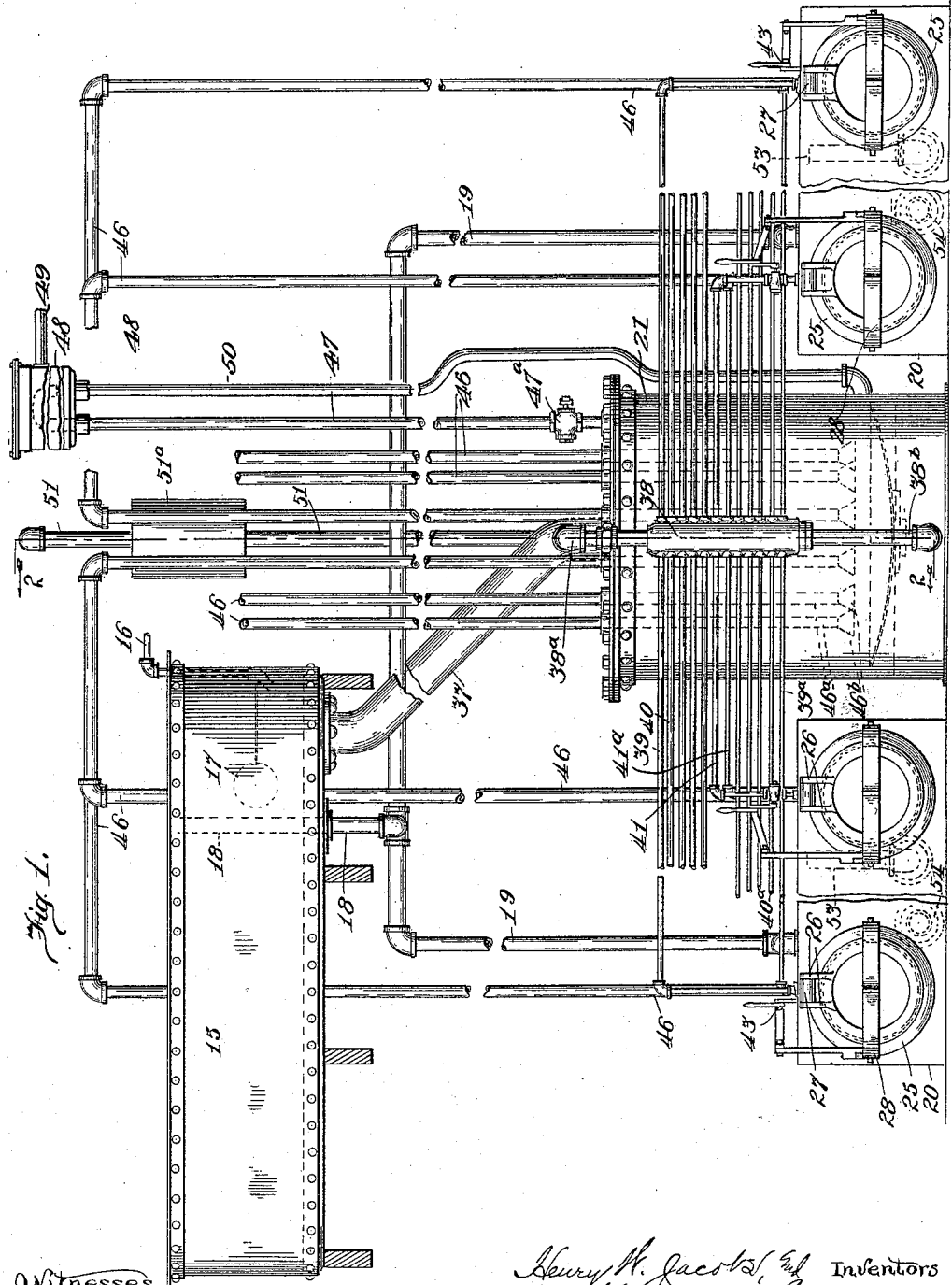

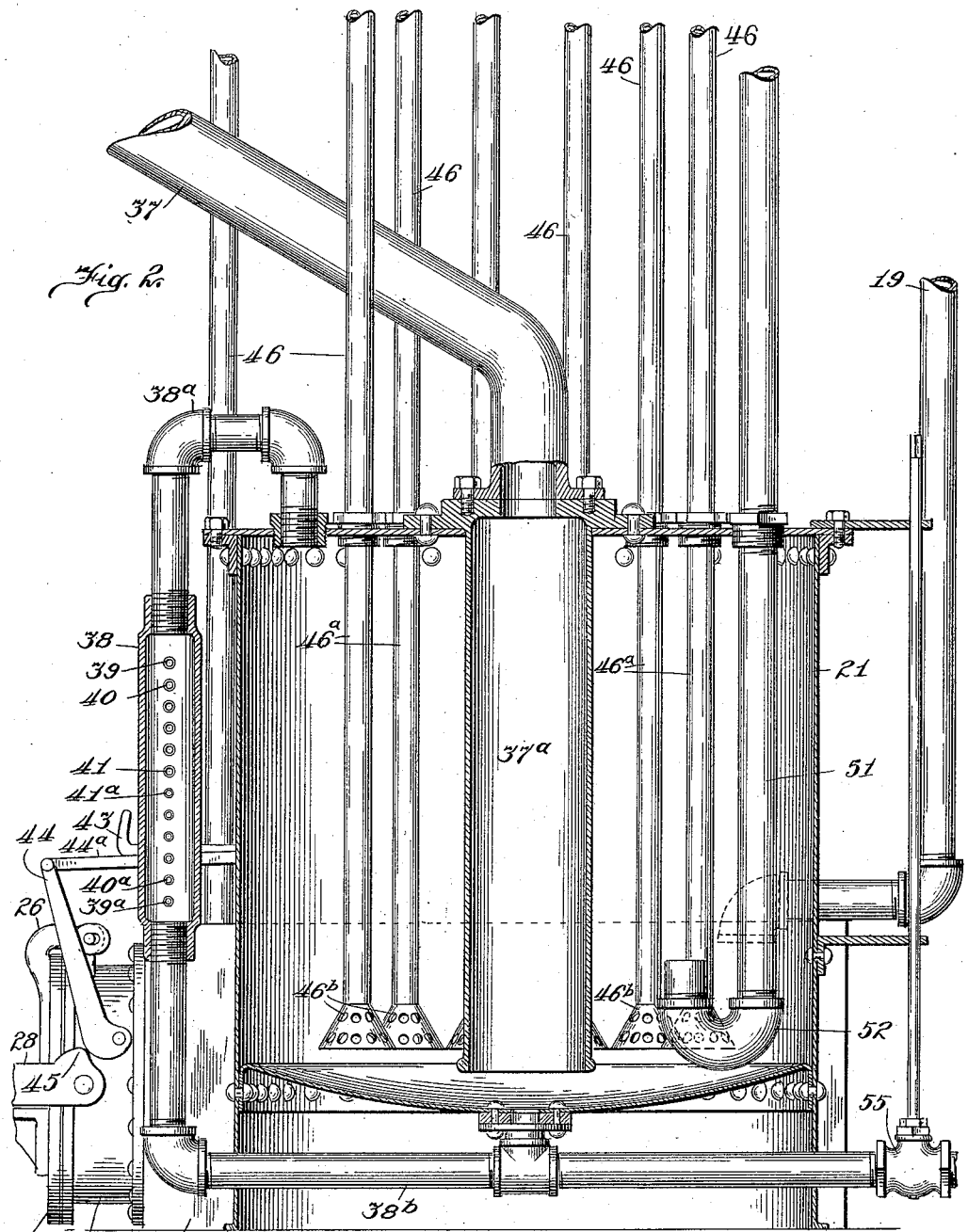

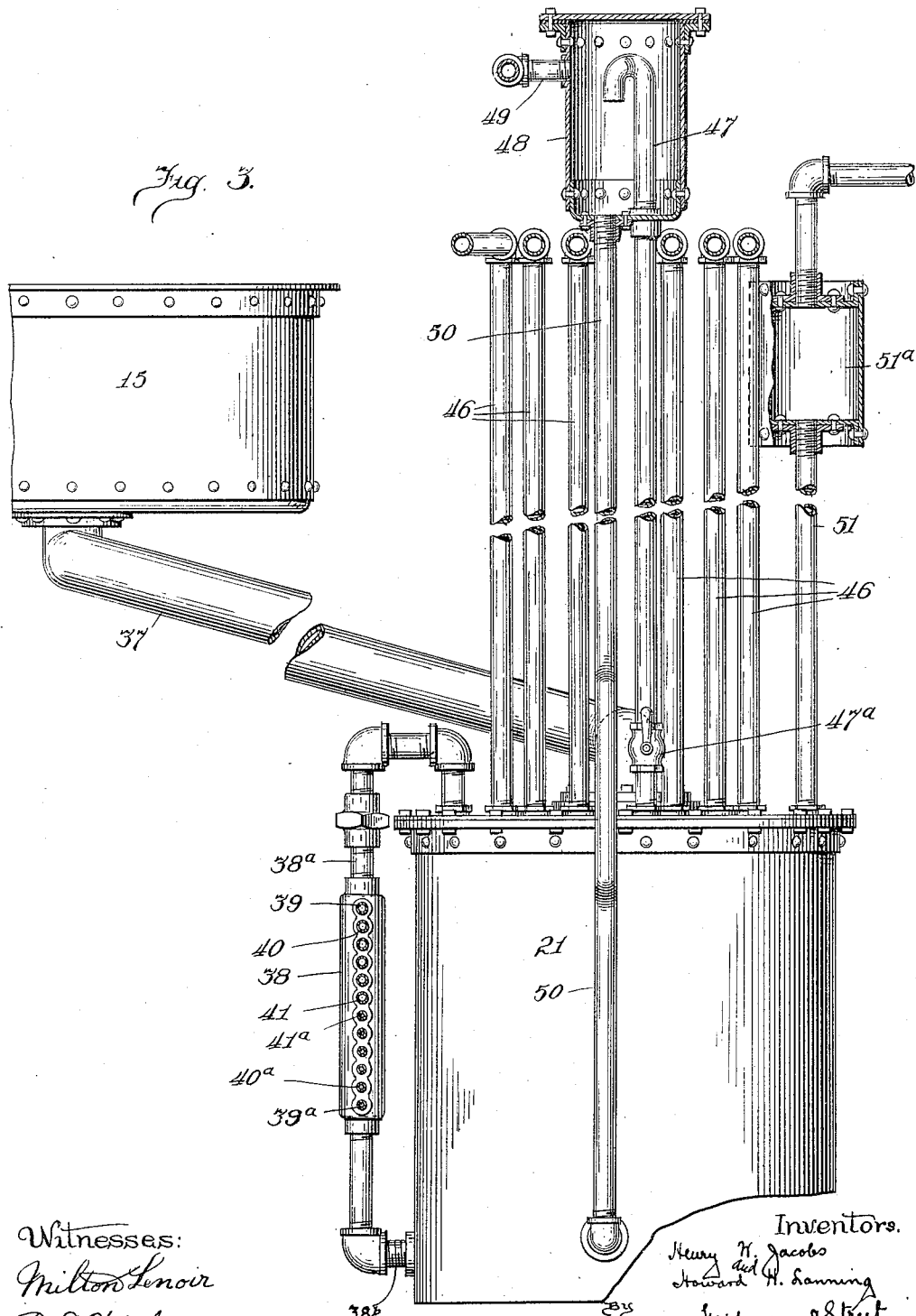

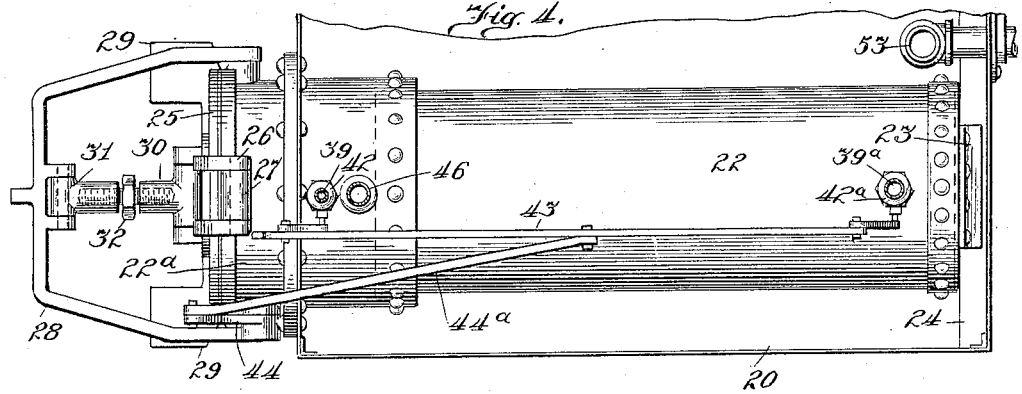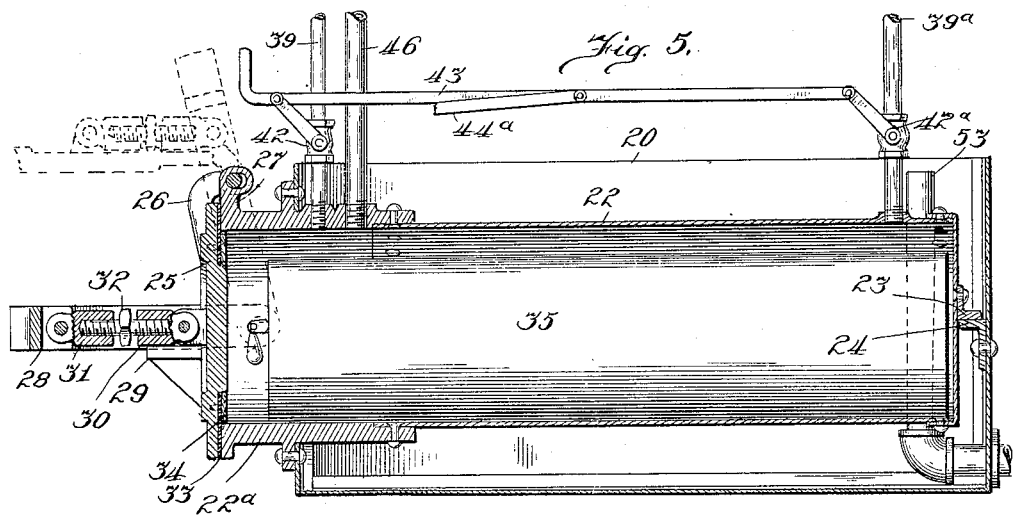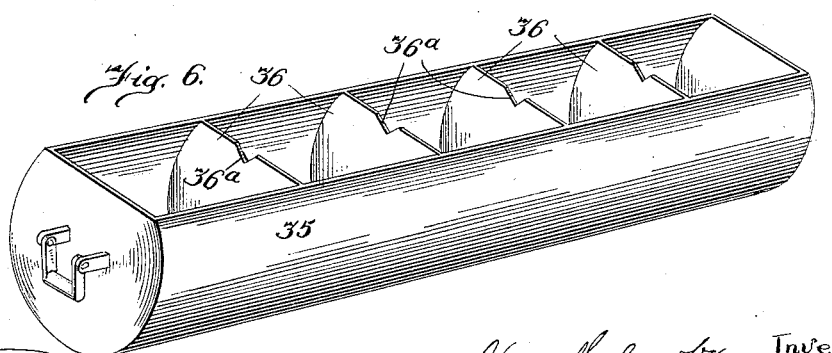

UNITED STATES PATENT OFFICE.

HENRY W. JACOBS AND HOWARD H. LANNING, OF TOPEKA, KANSAS.

ACETYLENE-GENERATING APPARATUS.

1,173,430.  Specification of Letters Patent.  Patented Feb. 29, 1916.

Application filed November 28, 1911. Serial No. 662,907.

*To all whom it may concern:*

Be it known that we, HENRY W. JACOBS and HOWARD H. LANNING, citizens of the United States, residing at Topeka, in the county of Shawnee and State of Kansas, have invented certain new and useful Improvements in Acetylene-Generating Apparatus, of which the following is a description, reference being had to the accompanying drawings, which form a part of our specification.

Our invention relates to apparatus whereby acetylene is generated from calcium carbid, and has to do more particularly with that type of generator wherein acetylene is generated by feeding water to the calcium carbid; it being understood, however, that portions of the apparatus might be employed in connection with generating apparatus operating on the carbid to water principle.

The object of the invention is to produce apparatus wherein the generation of acetylene will be automatically controlled or regulated by the rate of consumption of the acetylene, thus resulting in the delivery of the gas at a constant predetermined pressure under all conditions of service; the construction and operation of the apparatus being such that the quantity of gas necessary to be stored up within the apparatus, in order to provide for a continuous flow that will be equal under all conditions of service, will be reduced to the minimum.

A further object of the invention is the production of apparatus wherein the generation of acetylene from calcuim carbid and water will be absolutely continuous; that is, the apparatus is so constructed that the escape of an undue amount of acetylene, by reason of the removal of the spent carbid and the renewal of the charge of carbid, will be prevented and the introduction of an undue amount of air into the apparatus, obviated, so that the continuous flow of gas from the generator will in no way be affected.

Another object of the invention is the production of generating apparatus wherein it will be impossible to confine acetylene within any part thereof under more than normal pressure; and also wherein all forms of valves, or other mechanical regulating devices, have been eliminated, except in places where the use of such devices would insure greater safety and reliability but where their failure to act properly would not affect the safety of the apparatus.

The invention possesses other advantages which will be more readily understood from the following detailed description of the apparatus set forth in the drawings, wherein:—

Figure 1 is a side elevation of the generating apparatus, with certain intermediate portions of piping, etc., broken away. Fig. 2 is a vertical sectional view taken on the line 2—2 of Fig. 1 and looking toward the left, showing the gasometer and its respective pipes up to the point where they are broken away in Fig. 1. Fig. 3 is a partial elevation and sectional view of the upper part of the apparatus, with a portion of the water tank, gasometer, and the generating cells omitted, the traps in the discharge pipe and the overflow pipe being shown in section. Fig. 4 is a top plan view of one of the generating cells, with a portion of the casing or cooling jacket shown broken away. Fig. 5 is a central vertical section of the same. Fig. 6 is a perspective view of one of the carbid retaining drawings or trays.

In the particular construction of the invention as disclosed in the drawings, the apparatus comprises a water supply tank or compartment 15, which receives water from any suitable source of supply through pipe 16. Pipe 16 is provided with a ball cock 17, shown in dotted lines in Fig. 1, whereby the quantity of water in tank 15 is controlled. This tank is also shown provided with an overflow pipe 18 connecting with pipes 19 which lead to the different generating tanks 20, of which several are shown.

The generating tanks 20 are provided with generating cells 22, see Figs. 4 and 5, preferably arranged in the longitudinal manner illustrated, with the rear ends thereof supported by the angle irons 23 and 24 secured to the cells and tanks, respectively. The forward ends of these cells 22 consist of the heavy metallic cylindrical portions 22ª which are riveted or otherwise firmly secured to the tanks 20 so as to form a water-tight connection, as clearly shown in Figs. 4 and 5; the cylindrical portions 22ª being arranged to extend slightly out of the tanks, so that they may be provided with the hinged covers 25. As clearly shown in the drawings, the cells 22 are almost entirely inclosed by the tanks 20, so that when tanks 20 are filled with water, the cells will be submerged for the purpose of cooling the same; the cells, as shown in Fig. 5, being so supported within the tanks 20 that the cooling water may circulate around the cells.

The covers 25 are provided with the upwardly extending lugs 26, preferably curved rearwardly as shown, so as to engage with a lug 27 formed on the cylindrical portions 22ª of the cells. The lugs 27 are preferably provided with a horizontally extending slot through which the hinge forming pin extends, thus permitting slight play between the lugs 26 and the lugs 27, and enable the covers to bear uniformly against their seats on the cells, the lower part of the cover being placed under the same pressure as the upper part, so that a gas-tight connection may be had between the cells and their respective covers. Pivotally secured to the outer ends of each of the cells is a yoke 28, which is free to swing upward, but is held against downward movement by the lugs or webs 29 secured to the covers; these webs prevent the movement of the yokes below the horizontal plane of the centers of the covers, that is, beyond what may be termed a "dead center" position. The yokes and the covers are connected at their centers by adjustable struts which consist of the internally threaded socket member 30 pivotally secured to the cover, the internally threaded socket member 31 pivotally secured to the yoke and the oppositely threaded screw 32, which practically constitute a turn-buckle connection.

It is evident from the construction just described that rotation of screw 32 in one direction will put the covers under pressure, so that when the yokes are swung downwardly into the horizontal position shown in full lines, the covers will be held against the cells with the necessary pressure thereon to maintain a gas tight connection. It is evident from this construction that after screw 32 has been adjusted, the necessary pressure will instantly be obtained as soon as the yoke has been moved into horizontal position.

In order to insure a gas-tight connection being formed between the covers and the cells, the covers may be provided with gaskets 33, which are preferably secured to the bearing faces of the covers by means of the retaining rings 34, the latter being removably secured to the inner sides of the covers in any convenient manner.

Each of the cells 22 is provided with a tray or calcium carbid holding member 35, preferably made to conform with the inner shape of the cells. These trays or drawers 35 are preferably divided into water tight compartments by means of the partitions 36, of which any suitable number may be employed. The partitions 36 are shown provided at their upper edges with the V shaped notches 36ª for the purpose of permitting water to flow from one compartment to the other after the water has reached the top of the compartment. The trays or drawers are adapted to be readily removed from the cells 22 after the covers of the cells have been lifted, so that the spent carbid in any particular cell may be removed and a fresh supply of calcium carbid placed in the tray or drawer.

The water tank 15 is also provided with a large outlet pipe 37 which leads to a gasometer 21 where it is provided with an extension 37ª extending downward within the gasometer and discharging near the bottom thereof, as more clearly shown in Fig. 2. The gasometer 21, which consists of a gas and water-retaining tank, is provided with a manifold 38 on its exterior which is suitably connected by pipes 38ª and 38ᵇ with both the top and the bottom of the gasometer, so that the water level in the gasometer will correspond with the water level in the manifold. The manifold 38 is provided with a series of pipes which lead to the calcium carbid cells, preferably in a prearranged manner; for example, the pipes 39 and 39ª are shown leading to the carbid cells farthest removed from the gasometer; pipe 39 leading to the front part of the cell, while the pipe 39ª leads to the rear part of the cell; pipes 40 and 40ª lead to the front and rear parts of the cell adjacent to cell first mentioned; while pipes 41 and 41ª are shown leading to the front and rear parts of the cells adjacent to the gasometer.

The generating cells may be arranged on opposite sides of the gasometer as shown in Fig. 1. For convenience, only two cells have been shown in Fig. 1 at each side of the gasometer; the manifold 38 may, however, be of a size to permit of any desired number of pipes being lead therefrom; as, for example, the drawings show the manifold provided with twelve pipes leading from both sides of the manifold, thus illustrating an apparatus arranged to employ six generating cells on each side of the gasometer; it being understood, of course, that each cell is provided with two pipes whereby both the front and rear parts of the cells are connected with the manifold, as previously described.

It is evident from the construction described that the water will flow from the tank 15 through pipe 37 and its connection 37ª into the gasometer 21, and by reason of the connection between the manifold 38 and the gasometer, the water will rise in the manifold to the same height that it rises in the gasometer; as the water continues rising in both the gasometer and the manifold, it will first flow through pipe 39ª and into the rear of the cell with which it connects, namely, in this instance, the cell farthest removed from the gasometer, and thence through pipe 40ª to the rear part of the next or adjoining cell with which pipe 40ª connects. As the water continues to rise, in both the gasometer and the manifold, it is evident that water will begin to flow successively through the different pipes until all of the cells connected with the manifold will be receiving water therefrom.

The flow of water through the different pipes, whereby water is fed to the cells from the manifold, may be shut off by valves 42 and 42ª located in the front and rear pipes, preferably at a point in proximity to the cells, as more clearly shown in Fig. 5. In order that the valves in both pipes at the front and rear of each cell may be controlled and simultaneously operated, the respective valves of each cell are connected by a rod 43. The forward ends of the rods 43 may be connected to a link 44 of any suitable shape. The links 44 may each be provided with a lug or the links 44 may be bowed or bent as shown in Fig. 2, so that the bowed portion thereof will extend forward of the pivotal points of the links, to be engaged by the lug 45 formed on one arm of the yoke 28. From the construction shown and described it is evident that when the valves are opened, the link 44 will be in contact with or in close proximity to the lug 45 on the yokes, so that when the cell is uncovered, which can only be accomplished by lifting the yokes upward, the operation of lifting the covers of the different cells will necessarily result in the closing of the valves of the water supply pipes leading to the cell or cells opened and thereby shut off the flow of water from the manifold to the cell opened.

Each cell is provided—preferably at the front end thereof where access thereto may be had in case it becomes necessary—with a pipe or conduit 46 which extends upward to a sufficient height above the level of the water tank 15 and thence downward to the gasometer 21, where each pipe 46 is provided with an extension 46ª which terminates near the bottom of the gasometer. The end of each extension is provided at its orifice with an inverted funnel shaped member 46ᵇ whose sides are provided with a suitable number of perforations, as clearly shown in Fig. 2.

The gasometer 21 is provided with a pipe or conduit 47 leading from the top of the gasometer to the place of consumption; the conduit 47 being provided with a suitable valve as at 47ª, see Fig. 1, where the out-flow of gas may be controlled.

This pipe 47 is preferably arranged to extend to a point above the horizontal plane of the water-tank, where it terminates in a trap 48. This trap preferably consists of a cylindrical casing, as clearly shown in Fig. 3, one end of which may be provided with a removable cover. The discharge pipe 47 is preferably arranged to extend up almost to the top of the casing 48 with its upper end bent downwardly, as clearly shown. The upper end of the trap or casing 48 is provided with a conduit 49 which leads to the point where the gas is to be used. The lower part of the trap or casing 48 is connected by a pipe 50 with the gasometer 21; the pipe 50 preferably extending downward into the gasometer to a point near the bottom thereof; the object of this pipe being to drain off any water that may be conveyed by the gas through discharge pipe 47 to the trap or casing 48.

The gasometer is also provided with an upwardly extending blow-off pipe 51, which is provided with a cylindrical trap 51ª, whereby any water that may be blown off with the excess gas will be allowed to flow back through pipe 51 into the gasometer and assist in restoring the water-seal at the lower end of pipe 51. The lower end of pipe 51 is shown provided with a return or U-shape bend or coupling 52, the object whereof is to cause a sufficient reduction in the volume and pressure of the gas confined in the gasometer to such an extent, before the water-seal is restored at lower end of pipe 51, that the inertia of the column of water entering pipe 51 will not be sufficient to force this column of water high enough above the level of water in supply tank 15 to cause it to be discharged from the outlet of pipe 51. As shown in Fig. 2, the orifice of member 52 should be at a higher level than the perforations 46ᵇ and the point where the water-seal breaks should be above lower orifice of extension 37ª.

In order that the quantity of cooling water in the generating tanks 20 may be controlled, these tanks are each provided with an overflow pipe 53, shown in full lines in Figs. 4 and 5 and in dotted lines in Fig. 1; at the same time, in order to permit of the tanks being drained when it is desired to clean them, they are provided with the drain pipes as at 54, which may connect with the sewer. For this same reason, pipe 38ᵇ which connects with the bottom of the gasometer, is also provided with an extension which may lead to a sewer; these sewer connecting pipes are, of course, provided with suitable shut-off valves as, for example, at 55 in pipe 38ᵇ, see Fig. 2; the valve 55 in Fig. 2 being shown provided with the operating stem or rod to permit of its easy manipulation.

The operation of the generating apparatus is as follows:—The water tank 15 is suplied with water through filling pipe 16 and the water permitted to flow through pipe 37 down into the gasometer 21 from whence it will flow out of the bottom into the pipe 38ᵇ. As the connection with the sewer is shut off by the valve 55, it is evident that the water will rise in pipe 38ᵇ simultaneously and equally with the water in the gasometer. When the water reaches the manifold 38, it will begin to flow successively through the pipes leading from the manifold to the generating cells. It will be understood, of course, that before the water is permitted to flow into the gasometer, the trays 35 in the different generating cells are filled with calcium carbid and the trays inserted in their respective cells with the covers of the cells firmly clamped in closed position. It is apparent from the construction shown and described that as the water rises in both the gasometer and the manifold, it will first begin to flow through the lowest set of pipes leading from the manifold, namely pipes 39ª, which lead to the rear part of the cells farthest removed in the particular construction illustrated in the drawings and arranged on opposite sides of the gasometer. As soon as the water in the first compartment reaches the top of the partition 36, and water is still flowing through the pipes from the manifold, it will flow through the notch 36ª into the next compartment and so on until generation in all of the compartments takes place. The continued rising of the water in the manifold will successively bring the different generating cells into operation, so that by the time the water has reached the top of the manifold, water will be discharging into all of the cells and acetylene gas will be generated in all of the cells of the apparatus. The gas generating in the different cells will be conducted through the pipes 46 to the bottom of the gasometer, where it will be liberated in small bubbles through the perforated funnel shaped orifices of the different pipes and rise to the upper part of the gasometer. With the gasometer supplied with water, the gas discharged through the perforations of the funnel shaped orifice will be compelled to pass upward through the water and become thoroughly washed in its passage to the upper portion of the gasometer. The accumulation of the gas in the upper part of the gasometer 21 will, of course, displace the water and force it to return through connection 37ª and conduit 37 to the water tank 15. By reason of the manner in which the manifold is connected to the gasometer, namely, both at the top and bottom thereof, the receding of the water in the gasometer will also compel the water in the manifold to recede to an equal extent. With the continued generation of gas in the generators, the amount accumulated in the upper part of the gasometer will force the water downward until the latter will successively reach levels below the points of connection between the manifold and the different pipes leading to the generating cells. With the water supply thus successively cut off from the various generating cells, it is evident that the generation of acetylene will thus be gradually diminished. If the consumption of the gas is less than the amount of generation, the gasometer will become so filled with gas that the water will be displaced to a point beneath the lowest connection between the manifold and the generating cells, thus automatically stopping entirely the feeding of water to the cells and thereby preventing the generation of acetylene. In the event that the generation of acetylene is beyond this capacity of the gasometer, the water will be forced out of the gasometer and up through the inlet pipe and its connections, 37 and 37ª, respectively, until the upper level of the water in the gasometer reaches the return bend or seal 52 at the lower end of blow-off pipe 51; the pressure of the gas will then cause the water seal to become broken and allow the excess gas to escape from the gasometer through blow-off pipe 51. Any water that may be carried out through pipe 51 with the gas that is blown off will be trapped in chamber 51ª and allowed to flow back into the gasometer as soon as the pressure of the escaping gas diminishes. As soon as a sufficient quantity of gas has been blown off to reduce the pressure within the gasometer, it is evident that the water will again begin to flow into the gasometer until its level is above the return bend 52 of blow-off pipe 51, and thus automatically restore the water seal and prevent the further escape of gas. As the gas contained in the gasometer is drawn off through pipe 47 and consumed, the water level gradually rises and as the orifices of the pipes leading from manifold 38 are successively submerged, a resumption of the generation of acetylene is automatically brought about in the respective generating cells.

It is apparent from the apparatus shown and described that merely the requisite number of generating cells will be brought into operation necessary to supply the amount of acetylene required; that is, in case the gas generated by one cell is sufficient to meet the demands, the water level in the gasometer and the manifold will not rise above the lowest set of pipes leading from the manifold, but will remain stationary at this point until all the carbid in the cell or cells, fed by the lowest set of pipes, has become exhausted, or until the rate of consumption of the gas increases to such an extent that said cell or cells just referred to cannot meet the demand; when this situation arises, the decreased pressure of gas in the gasometer on the water will allow the water to rise to a higher level, thereby causing generation to begin or to be resumed in one or more additional cells as may be required to supply the demand.

It is evident, therefore, from the foregoing description, that the operation and control of the generating apparatus is entirely automatic, the generation being automatically adjusted to suit the rate of consumption within the limits of the capacity of the apparatus.

Should the volume of water displaced by the acetylene in the gasometer be sufficient to cause the water tank or compartment 15 to overflow, it will be seen that the excess water will pass through over-flow pipe 18, down through pipes 19 and into the generating tanks 20, surrounding the generating cells, where it will displace an equal amount of the cooling water; the excess water in the generating tanks being allowed to overflow through pipes 53 leading to the sewer or any other suitable point.

It is preferable in applicants' construction, that the float valve be adjusted so as to close when the water level in tank 15 is a little, say half an inch or less, below the entrance to pipe 18, and the areas of liquid acted on by the gas pressure in tank 21 and atmospheric pressure in tank 15, are so proportioned that when the water level in tank 15 reaches the entrance to overflow pipe 18, under normal working conditions, the water in lower tank 21 passes below the lowest of pipes 39ª.

As the calcium carbid in any one or more of the generating cells becomes consumed or spent, it is evident that said cells can be replenished without in any way interfering with the operation of the apparatus, as the cells are all independent of each other, being separately connected with the gasometer; and when it is desired to replenish the carbid in a cell, the covering of the cell is opened by lifting the yoke upward, which will compel the cover to move therewith, by reason of the toggle joint connection between the yoke and the cover; as soon as the yoke is moved upward, it is apparent that the cam 45 on the yoke will press against the link or lever 44 which in turn will operate lever 43; as lever 43 is connected with the two valves in the feed water pipes of said cell, the flow of water from the manifold to said cell will be automatically shut off. This will permit the tray of the cell to be withdrawn, the spent carbid removed therefrom and a fresh supply of calcium carbid placed in the different compartments of the tray. The tray may then be reinserted in its cell and the cover closed by pulling the yoke downward until it reaches the point of "dead center" for the toggle-joint connection, that is, with the yoke in a substantially horizontal plane, as shown in Fig. 5. The valves in the two feed water pipes of the cell may then be opened by pulling the rod 43 forward, thus putting the cell in condition for generation when it is automatically brought into play.

When it is desired to clean out the apparatus, the valve 54 in the different generating tanks 20, and the valve 55 in pipe 38ᵇ, connected with the bottom of the gasometer, are opened, which allows all the cooling water to drain out of tanks 20 and all of the water to drain out of the gasometer 21, the manifold 38, as well as water tank 15; it being understood, of course, that the inlet pipe 16 is first closed off.

It will be seen from the construction shown and described, that the capacity of the apparatus may be increased or diminished without the necessity of altering the gasometer and water supply tanks, as generating cells of different capacities may be used interchangeably with the same gasometer, and the generator units may be either increased or diminished to suit the demands and requirements; for example, the same result can be secured by either increasing or decreasing the number of generator units or tanks, or by using generator units or tanks of the maximum size and increasing or decreasing the number of generating cells in each tank. It is evident that when the number of generating cells is either increased or decreased, the number of feed water pipes leading from the manifold must be increased or decreased, respectively; it being understood also, that the pipes leading from the manifold must be arranged at different horizontal planes, so as to be effective with different levels of water in the manifold, as has been previously described.

By having the generated gas discharged in the bottom of the gasometer it will be compelled to pass upward through the water in the gasometer and thereby be cleansed. The flow of gas from the gasometer may, of course, be controlled by the valve 47ª, in the outlet or discharge pipe 47.

Where the gas discharged from the gasometer is to be led to or consumed at a point beneath the level of the water in supply tank 15, it is evident that, under certain conditions, unless means are employed to prevent, the water might be carried from the apparatus with the gas. For this reason the discharge pipe 47 is led into a chamber or cylindrical trap, where the end of the pipe may be provided with a return bend, as clearly shown in Fig. 3. Any water that may be carired with the gas through pipe 47 will fall to the bottom of the trap 48 and be discharged therefrom through pipe 50 which leads into the bottom of the gasometer, while the gas will be allowed to pass from trap 48 through pipes 49 to the point of consumption.

The construction shown and described is the embodiment of the invention in its preferred form, but it is apparent that alterations may be made in certain details without departing from the spirit of the invention, for example, the gasometer water supply pipe extension 37ª, which is shown of larger diameter than the diameter of the supply pipe, is illustrated as a separate member from the supply pipe, but it is evident that the extension and the supply pipe could be made integral, and other changes may suggest themselves in the adaptation of the invention to different conditions; we do not wish to be understood as limiting ourselves to the exact constructions shown and described, but—

What we claim as our invention and wish to secure by Letters Patent is:—

1. An apparatus of the class described, comprising one or more calcium carbid-receiving cells, a gas-receiving chamber provided with a gravity controlled water supply, a manifold having connection with said chamber, means intermediate of said manifold and the cells, whereby water is conveyed from said chamber to the cells, the relation between said means and the manifold being such that the level of the water in said chamber will determine the quantity of water conveyed to said cells, and means intermediate of the cells and said chamber whereby the generated gas is conveyed to said chamber.

2. An apparatus of the class described, comprising one or more calcium carbid-receiving cells, a gasometer provided with a water supply, a manifold having connection with the gasometer and adapted to receive water therefrom, the relation between the manifold and the gasometer being such that the level of the water in both the gasometer and the manifold will be equal, means intermediate of the manifold and said cells whereby water is conveyed from the manifold to the cells, said means being so arranged that the height of the water will determine the quantity of water conveyed to the cells, and means for conveying the generated gas from the cells to said gasometer.

3. An apparatus of the class described, comprising one or more calcium carbid-receiving cells, a gasometer, a manifold connected with the upper and lower part of the gasometer, a water tank having connection with a water supply, said tank having connection with the gasometer and arranged to deliver water to the bottom of the gasometer through the action of gravity, a series of pipes leading from the manifold to each of said cells and communicating with the cells at different points, the connection between the pipes and the manifold being arranged in different horizontal planes so that generation in the cells may be successively induced at different points, and means whereby the generated gas is conveyed from the cells to the gasometer and delivered at a point beneath the normal water level therein, an intermediate point in said means being arranged above the maximum level of the water in said tank whereby the return flow of gas through said means is prevented.

4. An apparatus of the class described, comprising one or more calcium carbid-receiving cells provided with compartments having communication with each other at their upper parts, a gasometer provided with a water supply, a manifold connected with said gasometer and so arranged that the water level in the manifold will be equal to the water level in the gasometer, a series of pipes intermediate of the manifold and the cells for conveying water from the former to the latter, said pipes being arranged in pairs with one pipe leading to the front end of a cell and the other pipe leading to the rear part of the cell, the relation between the pipes of each pair and the manifold being such that water will flow through one pipe in advance of the other whereby generation is induced in one compartment of a cell in advance of the other compartment or compartments, and means whereby the genrated gas is conveyed from the cells to the gasometer.

5. An apparatus of the class described, comprising one or more calcium carbid-receiving cells, a gas-receiving chamber provided with a water supply, a manifold connected with said chamber so that the water level in the manifold will be equal to the water level in said chamber, a series of pipes intermediate of said cells and said manifold whereby water is conveyed from the latter to the former, the pipes being arranged in pairs with one pipe leading to each end of a cell, while the relation between the pipes of a pair and the manifold is such that water will be conveyed to one end of a cell in advance of the flow of water to the other end of said cell, and means whereby the generated gas is conveyed from the cells to the gas-receiving chamber.

6. An apparatus of the class described, comprising one or more calcium carbid receiving cells, a water jacket surrounding said cells, a gas receiving chamber, a water tank having connection with a water supply, said tank being arranged to deliver water to the gas receiving chamber through the action of gravity, means whereby water is delivered from the tank to said water jacket, said means being so arranged that the delivery of water to the water jacket is controlled by the rate of generation in the cells, means intermediate of the gas receiving chamber and the cells whereby water is conveyed from the former to the latter, the relation between said means and the gas receiving chamber being such that the pressure of gas in the gas receiving chamber will control the flow of water through said means, and means whereby the generated gas is conveyed from said cells to the gas receiving chamber.

7. An apparatus of the class described, comprising one or more calcium carbid receiving cells, a gas receiving chamber provided with a water supply, a series of pipes having connection with said chamber and the cells whereby water is conveyed from the former to the latter, one pipe being connected with the front end of a cell while the other connects with the rear end of the cell, the relation between the pipes and gas receiving chamber is such that the pressure of gas within the chamber will control the flow of water to one end of a cell in advance of the flow to the other end of the cell, means for conveying the generated gas from the cells to said chamber, and blow-off means provided with an upwardly directed orifice at the lower end thereof whereby excess gas will be discharged from said chamber at a level sufficiently above the water in said chamber and prevent the mingling of water with the gas passing through said means.

8. An apparatus of the class described, comprising one or more calcium carbid-receiving cells, a gas-receiving chamber provided with a water supply, a manifold connected with the gas-receiving chamber and so arranged that the water level in the manifold will be equal to the water level in the gas-receiving chamber, a series of conduits intermediate of the manifold and said cells whereby the water is conveyed from the former to the latter, said conduits being arranged in pairs with each conduit of a pair communicating with a different portion of a cell so that generation may be successively induced at different points in each cell, and means whereby the generated gas is conveyed from the cells to the bottom of the gas-receiving chamber.

HENRY W. JACOBS.
HOWARD H. LANNING.

Witnesses:
FRANK MITCHELL,
DAVID H. OWEN.

Copies of this patent may be obtained for five cents each, by addressing the "Commissioner of Patents, Washington, D. C."